ABSTRACT OF THE DISCLOSURE

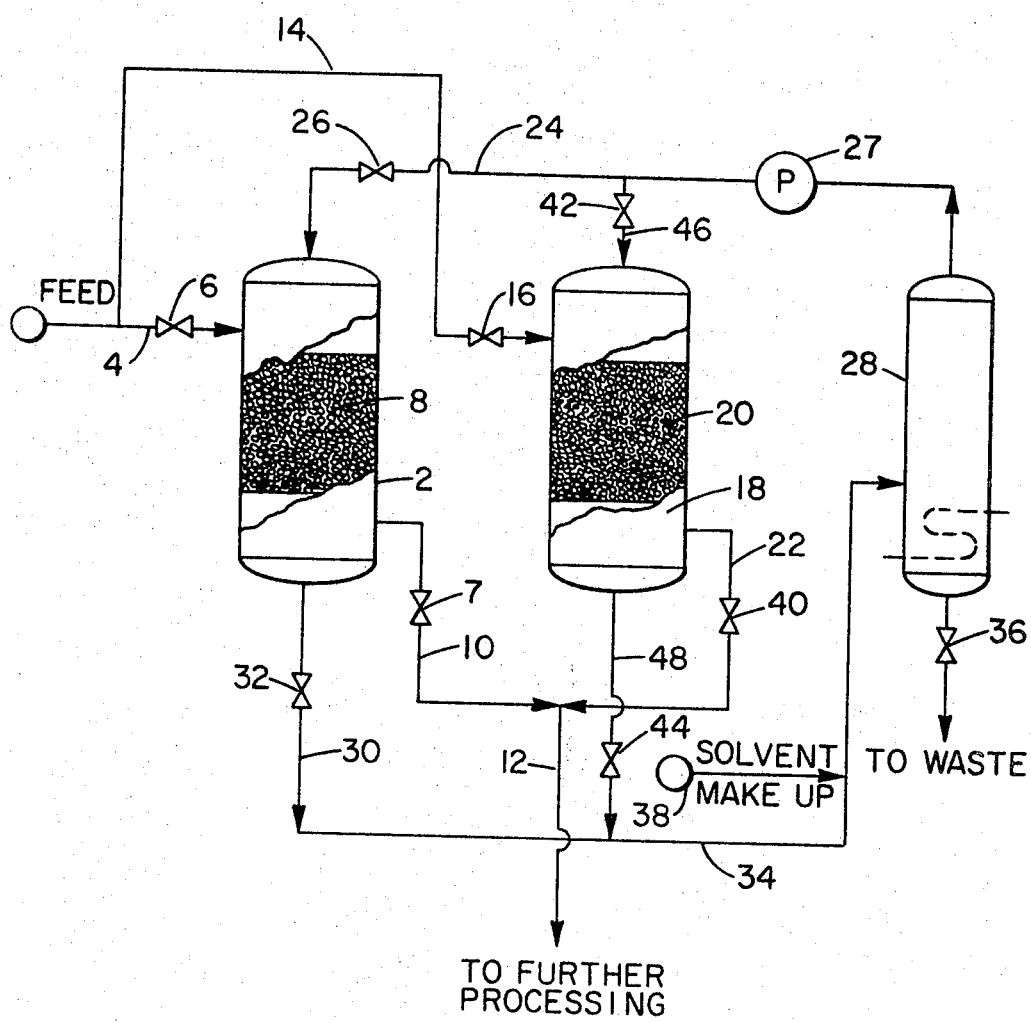
LAMAR F. SUDDUTH
SHELBY P. SHARP
INVENTORS
ATTORNEY 3,450,629
RECLAMATION OF ADSORPTIVE MATE-
RIAL USED IN DESULFURIZATION OF
HYDROCARBONS
Lamar F. Sudduth and Shelby P. Sharp, Tulsa, Okla., assignors to Pan American Petroleum Corporation, Tulsa, Okla., a corporation of Delaware
Filed Dec. 27, 1966, Ser. No. 604,878
Int. Cl. C10g 25/12, 25/04
U.S. Cl. 208—305   9 Claims

Adsorptive materials such as molecular sieves are used in desulfurization of liquid or gaseous hydrocarbon streams. The adsorbents are occasionally contaminated with elemental sulfur and can no longer adsorb sulfur containing compounds or be regenerated by conventional methods. When such contamination occurs, the elemental sulfur which is deposited in the pores of the adsorbent is removed by an extraction or washing treatment with a sulfur solvent such as carbon tetrachloride or carbon disulfide. The resulting washed adsorbent is then preferably treated with a light hydrocarbon liquid or vapor to remove the sulfur solvent and subjected to hot gas at 400° to 450° F., after which adsorptive capacity is instant and the adsorbent can be placed in use.

SPECIFICATION

The present invention relates to the desulfurization of fluid hydrocarbon streams such as are encountered in refinery and natural gasoline plants. More particularly it is concerned with a novel method for reconditioning the sulfur removal or sweetening agent employed in the desulfurization process.

BACKGROUND OF INVENTION

It is common practice to employ fixed bed sweetening units in the treatment of gaseous or liquid hydrocarbon streams containing sulfur compounds, hereinafter referred to as "sour streams." Usually these units are employed in pairs with one unit in operation while the bed of the second unit is in the process of being reconditioned or regenerated. As examples of the sweetening agent used in such units there may be mentioned silica gel, alumina and molecular sieves such as for instance sodium aluminum silicates of the type described in Johnson et al. 2,971,824. Ordinarily, after a bed of the sweetening agent has been properly reconditioned by conventional methods, it can remain on stream for a period of 12 or more hours up to the adsorptive capacity of the material. The reconditioning step generally involves diverting the hydrocarbon flow to an activated or regenerated unit and treating the spent unit with hot (400°–450° F.) natural gas or equivalent gas to drive off adsorbed materials. This heat treatment extends for a period of from about 2 to 3 hours, usually after which the revivified bed is cooled with natural gas and is then ready for use.

In operation of this type of sweetening unit we have observed that after a period—which may vary from about 2 to 5 months—the adsorptive or sweetening material becomes contaminated to such an extent that the conventional regeneration treatment with hot gas as mentioned above is ineffective in restoring adsorptive capacity. On examination of said contaminated adsorption material we have found that free sulfur had been deposited in the pores or tiny passageways thereof. To our knowledge the hydrocarbon stream flowing to the sweetening facilities contains no free sulfur—only hydrogen sulfide, some mercaptans and frequently traces of carbonyl sulfide. The hot gas contacting the particulated sweetening material is usually natural gas. Under these conditions one would not ordinarily expect free sulfur to be formed at such low temperatures and in the substantial, if not complete, absence of air even though the sweetening material employed, i.e., molecular sieves, alumina etc., are commonly known catalysts used for the conversion of various sulfur-containing compounds, such as hydrogen sulfide, into free sulfur by direct or partial oxidation.

SUMMARY OF THE INVENTION

Although, as indicated above, conventional regeneration methods are inefficient to revive such materials once it has become impregnated with free sulfur, we have found that said material can be completely renovated and restored to its initial efficiency by treatment with a solvent for the sulfur that has been so deposited. Examples of such solvents are carbon tetrachloride and carbon disulfide. These materials or mixtures thereof may be used either in liquid or vapor form. In practicing our invention the inactive adsorbent material is first treated with hot gas as described to drive off adsorbed substances which are volatile under pressure and temperature conditions employed in the conventional regeneration procedures. The non-volatile contaminants, namely elemental sulfur, are not driven off and we have found that they can be removed by a washing or extraction treatment in place with one of the aforesaid or equivalent solvents. In this way, the adsorptive material does not have to be removed from the vessel containing it. The solvent is drained from the vessel with impurities and purified for reuse by distillation or discarded.

BRIEF DESCRIPTION OF THE DRAWING

Our invention will be further illustrated by reference to the accompanying drawing in which a sour liquid propane stream comprising the overhead from a gasoline plant depropanizer column enters vessel 2 via line 4 and valve 6 at about 80° to 100° F. and 225 to 250 p.s.i. The propane stream is distributed over the top of a fixed bed of molecular sieve 8 and the impurities in said stream are adsorbed thereon. The resulting stream of purified propane is withdrawn from vessel 2 via lines 10 and 12 and sent to further processing outside the scope of our invention. This sweetening procedure is continued until sulfur compounds are detected in the purified stream. Such condition is normally determined by means of the Natural Gas Producers Association copper strip corrosion test. Thereafter valves 6 and 7 are closed, the feed to the system is switched to line 14 and valve 16 is opened. The sour propane stream thus introduced into vessel 18 then contacts fresh, regenerated adsorbent in fixed bed 20 and a purified product is withdrawn through lines 22 and 12.

When vessel 18 is placed in operation, vessel 2—which can no longer be effectively regenerated by hot gases—is subjected to reclamation by means of solvent extraction in accordance with our invention by first preferably introducing carbon disulfide or other sulfur solvent into vessel 2 (now at atmospheric pressure) in the form of a vapor or liquid mist through line 24 and valve 26 by means of pump 27. The solvent may be taken overhead from distillation column 28 in the form of a vapor and conducted as such into fixed bed 8 or may be circulated in liquid form. Since carbon disulfide boils at about 115° F., it generally condenses readily on the surfaces of the adsorbent material under the conditions prevailing in vessel 2. By entering vessel 2 and contacting fixed bed 8 in the form of a liquid, vapor or fine mist the solvent makes thorough contact with the adsorbent thus permitting substantially complete extraction therefrom of all deposited elemental sulfur. As the liquid, condensed or coalesced solvent moves through bed 8, sulfur is extracted from the molecular sieves thus forming a relatively concentrated solution of free sulfur. This solution is removed from vessel 2 via line 30 and valve 32 and transferred to distillation column 28 through line 34 or if distillation is impractical, the wash solvent may be discarded. In column 28 the solvent is purified with the vapors thereof being taken off overhead through line 24 at a temperature of about 115° F. A higher boiling liquid fraction containing free sulfur is removed from the system through valved line 36. Solvent makeup is supplied through line 38.

Once fixed bed 8 has been fully reclaimed by solvent extraction, which ordinarily should require no longer than 2 or 3 hours, the solvent is removed from the molecular sieve by means of a wash with LPG or similar material and then placed on normal cycle of cooling, regeneration or conditioning, as described, prior to being returned to the adsorption or sweetening cycle.

When vessel 20 shows evidence of excessive contamination it is similarly reclaimed by first closing valves 16 and 40 and opening valves 42 and 44. Solvent from line 24 is then introduced into bed 20 through line 46 in liquid, mist or vapor form, allowed to percolate downwardly through bed 20, the resulting solution of impurities removed by means of line 48 and processed as previously outlined.

DESCRIPTION OF PREFERRED EMBODIMENT

Our invention is further demonstrated by reference to the following example.

Example

Samples of Linde Type 13X molecular sieves of the kind mentioned in the aforesaid U.S. 2,971,824 were removed from a gasoline plant sweetening unit which has been employed to treat the overhead streams from gasoline plant depropanizer and debutanizer units. This material had become unusable since it could no longer be effectively regenerated by customary methods. Subsequently a series of tests were undertaken to compare the efficiency of this material with fresh Linde Type 13X molecular sieves and with the portions of the unusable sieves that had been subjected to the regeneration process of our invention. In these tests varying amounts of hydrogen sulfide and mercaptan were added to butane or propane in controlled concentrations and thereafter exposed to the different samples of molecular sieves under conditions similar to those actually used in commercial operations. As will be from the data in the table below, molecular sieve material reclaimed in accordance with our invention compared very favorably to any unused molecular sieves of the same type and of course is far superior to the spent sieves removed from the gasoline plant sweetening unit. In carrying out this work, a 50–50 mixture of carbon tetrachloride and carbon disulfide was used.

TABLE

| Adsorptive material | Description of sour stream passed through mol sieve | Cadmium sulfate analysis,[1] grains/100 cubic feet | | | |
|---|---|---|---|---|---|
| | | Before molecular sieve | | After molecular sieve | |
| | | $H_2S$ | Mercaptan sulfur | $H_2S$ | Mercaptan sulfur |
| New 13X molecular sieve | Known mixture of butane and hydrogen sulfide | 0.13 | | None found | |
| Molecular sieve 13X removed from propane treater | do | 0.13 | | 0.07 | |
| New 13X molecular sieve | Elk basin [2] propane | 0.7 | 0.15 | None found | 0.14 |
| Molecular sieve 13X removed from propane treater | do | 0.7 | 0.15 | 0.06 | 0.12 |
| Molecular sieve 13X removed from propane treater and pretreated by washing with $CCL_4$ and $CS_2$ regenerated at 450° F. | Known mixture of butane and hydrogen sulfide | 0.13 | | None found | |

[1] In this procedure a measured volume of natural gas is bubbled through neutral cadmium sulfate solution to remove hydrogen sulfide and then through basic cadmium sulfate to scrub out the mercaptans. The amounts of hydrogen sulfide and mercaptan sulfur in the absorbers are then determined iodometrically. Further details are described in NGPA Publication 2265-65.
[2] Elk Basin Field, Elk Basin, Wyoming The importance of our invention will be appreciated when it is realized that in the case of a single vessel forming a part of a commercial sweetening unit said vessel having a capacity, for example, of 1530 gallons, the savings in molecular sieve material alone, costing about $1.65 per lb., is $11,125 when using carbon disulfide, and $10,600 when using carbon tetrachloride over the cost of adsorbent replacement. For an operation of this size, 700 gallons of solvent is required, costing $875 and $1400 for carbon disulfide and carbon tetrachloride, respectively, assuming the solvent is used only once. However, as a practical matter, the solvent can be reused with relatively little makeup being required.

In addition to the above savings, very substantial economies are realized by avoiding the labor costs required to remove the spent sieve material from the sweetening unit and recharging the latter with fresh adsorbent after the original charge can no longer be regenerated by conventional methods.

While the adsorptive material employed in the desulfurization step referred to above may be selected from a wide variety of materials, we generally prefer bauxite and molecular sieves, particularly the synthetic crystalline aluminosilicates having a zeolitic structure of rigid three-dimensional network, uniform pore size and well defined intra-crystalline dimensions such that molecules of suitable size and shape may be transported in either direction between the exterior phase and the interior of the crystalline zeolite.

We claim:
1. In a method for the regeneration of a particulate material capable of adsorbing hydrogen sulfide in the presence of a fluid hydrocarbon stream, said material having been contacted by a fluid hydorcarbon stream containing hydrogen sulfide, continuing this adsorption step until said material is saturated with hydrogen sulfide, regenerating said saturated material by treatment with hot gas in the substantial absence of oxygen and repeating the above cycle until said material no longer can be regenerated by treatment with hot gas, said gas not being substantially in excess of about 450° F., the improvement which comprises:
   washing said material which can no longer be regenerated by said hot gas treatment, and which contains free sulfur, with a solvent for sulfur under conditions such that at least a portion of said solvent is in liquid form while in contact with said material, and
   separating the resulting solvent containing extract from said material.

2. The method of claim 1 in which said fluid hydrocarbon is sour natural gas.

3. The method of claim 1 in which said fluid hydrocarbon is a sour hydrocarbon liquid stream and the adsorption step is carried out at a temperature of from about 80° to 110° F. and at a pressure of from about 225 to 250 p.s.i.

4. The method of claim 1 in which the solvent employed is carbon disulfide.

5. The method of claim 1 in which the solvent employed is carbon tetrachloride.

6. The method of claim 1 wherein said particulate material is a molecular sieve.

7. The method of claim 1 wherein said particulate material is a synthetic crystalline aluminosilicate having a zeolitic structure of rigid three-dimensional network, uniform pore size and well defined intra-crystalline dimensions.

8. The method of claim 1 wherein the solvent is removed by extraction with a hydrocarbon liquid and the latter thereafter driven off by use of a hot gas at temperatures of from 400° to 450° F.

9. The method of claim 1 wherein the adsorption step is effected at a temperature not substantnally in excess of 100° F.

References Cited

UNITED STATES PATENTS

| | | | |
|---|---|---|---|
| 1,904,582 | 4/1933 | Watts | 252—412 |
| 1,933,508 | 10/1933 | Peck | 252—414 |
| 2,428,690 | 10/1947 | Tyson et al. | 208—305 |
| 2,515,131 | 7/1950 | Mack | 252—412 |
| 3,069,362 | 12/1962 | Mays et al. | 208—305 |

DELBERT E. GANTZ, *Primary Examiner.*

G. J. CRASANAKIS, *Assistant Examiner.*

U.S. Cl. X.R.

252—412

PO-1050
(5/69)

UNITED STATES PATENT OFFICE
CERTIFICATE OF CORRECTION

Patent No. 3,450,629            Dated    June 17, 1969

Inventor(s)   Lamar F. Sudduth and Shelby P. Sharp

It is certified that error appears in the above-identified patent and that said Letters Patent are hereby corrected as shown below:

Col. 3, line 59, "has" should be -- had -- ; line 73, after "be" insert -- seen -- .

Col. 4, line 56, "hydorcarbon" should be -- hydrocarbon -- .

Col. 5, line 2, "110° F." should be -- 100° F. -- .

Col. 6, line 2, "substantnally" should be -- substantially -- .

SIGNED AND
SEALED
NOV 18 1969

(SEAL)
Attest:

Edward M. Fletcher, Jr.
Attesting Officer

WILLIAM E. SCHUYLER, JR.
Commissioner of Patents